(12) United States Patent
Carter et al.

(10) Patent No.: US 8,601,393 B2
(45) Date of Patent: *Dec. 3, 2013

(54) SYSTEM AND METHOD FOR SUPPORTING DOCUMENT NAVIGATION ON MOBILE DEVICES USING SEGMENTATION AND KEYPHRASE SUMMARIZATION

(75) Inventors: Scott Carter, Los Altos, CA (US);
Francine Chen, Menlo Park, CA (US);
Patrick Chiu, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 897 days.

This patent is subject to a terminal disclaimer.

(21) Appl. No.: 12/242,757

(22) Filed: Sep. 30, 2008

(65) Prior Publication Data

US 2009/0193337 A1 Jul. 30, 2009

Related U.S. Application Data

(60) Provisional application No. 61/024,087, filed on Jan. 28, 2008.

(51) Int. Cl.
*G06F 17/00* (2006.01)
*G06F 3/00* (2006.01)

(52) U.S. Cl.
USPC ........... 715/821; 715/738; 715/765; 715/783; 715/825

(58) Field of Classification Search
USPC ......................................... 715/277, 784, 821
See application file for complete search history.

(56) References Cited

U.S. PATENT DOCUMENTS

| | | | | |
|---|---|---|---|---|
| 5,745,602 A * | 4/1998 | Chen et al. | .................... | 382/229 |
| 5,982,369 A * | 11/1999 | Sciammarella et al. | ...... | 715/835 |
| 6,205,456 B1* | 3/2001 | Nakao | ............. | 715/201 |
| 7,613,995 B2* | 11/2009 | Wen et al. | ..................... | 715/209 |
| 2004/0122657 A1* | 6/2004 | Brants et al. | ..................... | 704/9 |
| 2004/0210833 A1* | 10/2004 | Lerner et al. | ................... | 715/512 |
| 2006/0004725 A1* | 1/2006 | Abraido-Fandino | ............ | 707/3 |
| 2007/0061348 A1* | 3/2007 | Holland et al. | ............... | 707/100 |
| 2008/0059498 A1* | 3/2008 | Carus et al. | .................... | 707/100 |

FOREIGN PATENT DOCUMENTS

| | | |
|---|---|---|
| JP | 08-272822 A | 10/1996 |
| JP | 2001-101164 A | 4/2001 |
| JP | 2003-203091 A | 7/2003 |

OTHER PUBLICATIONS

TileBars: Visualization of Term Distribution Information in Full Text Information Access (Hearst) published by ACM in 1995.*
A. Berger et al., "A Maximum Entropy Approach to Natural language Processing, Computational Linguistics", vol. 22(1), pp. 39-71, 1996.
K. Berkner et al., "SmartNails—Display and Image Dependent Thumbnails", pp. 53-65, SPIE '04.
J. Carbonell, et al., "The use of MMR, diversity-based reranking for reordering documents and producing summaries", pp. 335-336, ACM SIGIR '98.

(Continued)

*Primary Examiner* — William Bashore
*Assistant Examiner* — Nathan Shrewsbury
(74) *Attorney, Agent, or Firm* — Sughrue Mion, PLLC

(57) ABSTRACT

Described is a system that characterizes segments of a document with one or more keyphrases and then uses the keyphrases to help users find interesting parts of a document. The keyphrases are displayed with information about the location of the phrase in the document and are used as pointers to quickly move to from an overview to a section of potential interest.

31 Claims, 7 Drawing Sheets

(56) References Cited

OTHER PUBLICATIONS

B. Erol et al., "Multimedia Thumbnails for Documents", pp. 231-240, ACM Multimedia '06.
M. Hearst, "TileBars: Visualization of Term Distribution Information in Full Text Information Access", pp. 59-66, ACM CHI '95.
M. Hood, "E-Newspapers: Digital Deliverance?", IEEE Spectrum, Feb. 2007, retrieved on Sep. 30, 2008.
The Java ME Platform, http://java.sun.com/javame, retrieved on Sep. 30, 2008.
A. Leuski, et al., "Lighthouse: showing the way to relevant information", pp. 125-130, IEEE InfoVis '00.
T. Rattenbury, et al., "CAAD: An Automatic Task Support System", pp. 687-696, ACM CHI '07.
P. Turney, "Extraction of keyphrases from text: evaluation of four algorithms", Technical Report NRC 41550, National Research Council of Canada, 1997.
A. Woodruff, et al., "Using thumbnails to search the Web", pp. 198-205, ACM CHI '01.
E. Tufte, Envisioning Information, Graphics Press, 1990.
Notification of Reason for Refusal for counterpart Japanese Patent Application No. 2009-007260 dated Apr. 23, 2013.

\* cited by examiner

SYSTEM AND METHOD FOR SUPPORTING DOCUMENT NAVIGATION ON MOBILE DEVICES USING SEGMENTATION AND KEYPHRASE SUMMARIZATION

CROSS-REFERENCE TO RELATED APPLICATION

This regular U.S. patent application is based on and claims the benefit of priority under 35 U.S.C. 119 from provisional U.S. patent application No. 61/024,087, filed on Jan. 28, 2008, the entire disclosure of which is incorporated by reference herein.

FIELD OF THE INVENTION

This invention generally relates to presenting information on information displays and more specifically to using displays of small size to render documents in the form convenient for viewing by a user.

BACKGROUND OF THE INVENTION

The size limitations of ultra-portable hand-held devices, such as cell phones or PDAs limit the size of the screen area available for viewing information. This makes it hard for users to read textual information using such a device. Various solutions to this problem are being developed in the industry.

There are many methods that have been proposed for viewing documents and web pages on small screens. For example, Woodruff et al., Using thumbnails to search the Web Pages, 198-205, ACM CHI '01, augment web search by automatically increasing the font size of search terms on returned documents. While the authors did not design their system for use on mobile devices, it could be implemented on mobile phone web browsers. However, the described approach does not use text summaries of segmented regions; only increases font size in situ rather than offering multiple different visualizations and interactors and also does not provide mechanisms for visualizing keyphrases across a non-web document.

Berkner et al., Image and Display Dependent Thumbnails, Pages: 53-65, SPIE '04, create a condensed view of a document page, or a SmartNail, by generating a layout with minimal white space that is composed of selected text in a readable size and selected images. In the created condensed view, the original document layout is usually changed. The goal of this study is to create a readable thumbnail for smaller displays such as PDAs. However, in the described system, there is no indexing between different sections and the original text.

The system described in Erol et al., Multimedia Thumbnails for Documents, Pages 231-240, ACM Multimedia '06, automatically creates an animation that pans to important segments on a web page. The described approach also includes audio cues that include keyphrases for the document text as well as figure captions. However, this approach does not augment manual interaction, and relies on audio, which at times may be unavailable or inappropriate.

In M. Hood, E-Newspapers: Digital Deliverance? IEEE Spectrum. February 2007, an iLiad document reader operates to overlay the title and first sentence of news articles on top of the full document.

Hearst's TileBars, described in TileBars: Visualization of Term Distribution Information in Full Text Information Access, Pages: 59-66, ACM CHI '95 (1995), include rows of tiles corresponds to the results of query term sets, where each tile represents a text segment, and the length of a row represents the length of the document. The term frequency is indicated by the gray level of the tile, and the term distribution by these tiles as they appear in the overall graphic representation.

Rattenbury and Canny's CAAD system, described in CAAD: An Automatic Task Support System. Pages: 687-696. ACM CHI '07 (2007), represents collections of documents in a pannable, zoomable interface. However, this system clusters files related to a common activity rather than keyphrases, and the display is not designed for a mobile interface. Additionally, Leuski's Lighthouse, described in Lighthouse: showing the way to relevant information, Pages: 125-130. IEEE InfoVis '00 (2000), is a search engine that presents returned documents with both a flat list and a cluster of spheres positioned according to the similarity of their corresponding documents.

Despite the foregoing advances, the conventional industry approaches are deficient in their ability to facilitate efficient use of displays of small size to render documents in the form convenient for viewing by a user.

SUMMARY OF THE INVENTION

The inventive methodology is directed to methods and systems that substantially obviate one or more of the above and other problems associated with conventional techniques for displaying of documents on small information displays.

Various embodiments of the inventive concept include devices, methods and computer readable mediums containing computer code for identifying multiple segments of a document, determining at least one keyphrase and associating the determined at least one keyphrase with each identified segment, displaying the determined least one keyphrase, and upon a user's selection of the least one keyphrase, enabling the user to view the corresponding segment of the document.

Various embodiments of the inventive concept also include a device with a display unit, a sensing unit, which is configured to sense input, a processing unit, which is operable to process the input, to identify multiple segments of a document; and to forward instructions to a display controller to highlight, zoom, or navigate through the identified document segments; and the display controller operable to process the forwarded instructions and to generate a resulting visual representation for display on the display unit. The processing unit is further configured to determine at least one keyphrase and associate the determined at least one keyphrase with each identified segment.

Various embodiments of the inventive concept also include devices, methods and computer readable mediums for displaying documents as visual representations and grouping the documents based on the occurrences of keyphrases; wherein the size of each visual representation depends on a function of the number of occurrences of all keyphrases in the corresponding document, highlighting all of the visual representations with at least one occurrence of a selected keyphrase; and highlighting only visual representations with at least one occurrence of each selected keyphrase when multiple keyphrases are selected.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
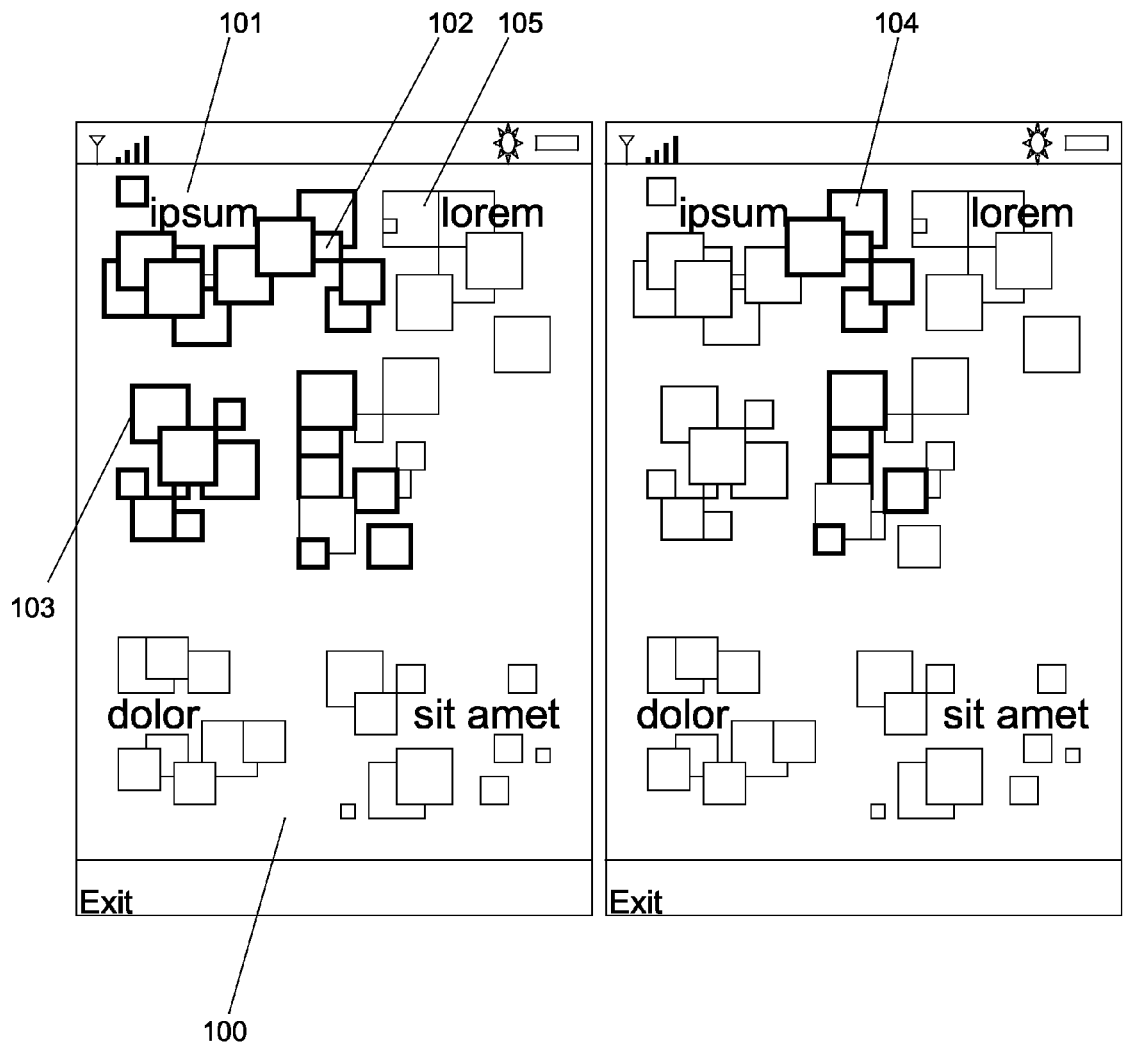
FIG. 1 illustrates a multi-document view in accordance with an embodiment of the inventive concept.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Viewing and identifying interesting sections of documents on a small screen, such as on a cell phone or PDA, is difficult. An embodiment of the invention provides a method that uses keyphrases for easily moving to interesting sections of the document while at the same time helping users to be aware of document context as they read portions of the document.

Technical Details

To process a document and create a visualization, sections, or segments, of text are first identified. In our implementation, these sections generally correspond to paragraphs or figure captions. The sections could alternatively be specified to be coarser, such as text under a sub-heading. Next, one or more keyphrases are associated with each text section. The keyphrases and identified sections are then used by the interface for visualizing and interacting with the document.

Text Section Identification

The input document may be a set of imaged pages, such as from a scanned paper document, or an electronic document. If the input document is imaged pages, layout analysis and OCR is first performed on the document. This may be done by separate components or by a more sophisticated OCR system, such as that marketed by Nuance (http://www.nuance.com) or ABBYY (http://www.abbyy.com), which will convert a scanned document into a PDF document.

Working with electronic documents with some markup, such as some PDF documents, the sections of text can be identified either directly from the tags, or if the tags do not contain section information, then sections can be identified using heuristics based on line spacing, font height, and indentation. For example, regions of text with the same line spacing and font height are considered to be in the same section unless the left edge is indented, indicating that the current line is the beginning of a new section. A larger spacing between a pair of lines also indicates the start of a new section.

Keyphrase Discovery

There are a number of ways to identify keyphrases, and any can be used (Turney, 1997). A straight-forward method is by tagging the part-of-speech (POS) of the text and then identifying POS tag sequences that correspond to a noun phrase (Turney, 1997). Another method is to identify sequences of words between "stop words", or non-content words (Chen, 1995).

When a document has multiple sections and keyphrases are selected to be representative of each section, there are methods that take into account previous key words or keyphrases that have already been identified in the text, and to give greater weight to terms that have not been selected as a keyphrase. Carbonell and Goldstein (1998) proposed the use of Maximal Marginal Relevance to rank documents using a weighted combination of the similarity of a document to a query and the similarity of a document to previously selected documents. Brants et al. (2004) propose the selection of keywords and keyphrases for interactive topic-based summarization using a statistical measure of segment characterization and differentiation, such as pointwise Mutual Information.

An embodiment of the inventive method for identifying keyphrases identifies sequences of words between stop words as candidate keyphrases. For each section of text, the candidate's keyphrases are scored and the best N keyphrases selected, where N is pre-specified and may be dependent on the amount of screen space available in the application.

To select the best keyphrases, we use a weighted combination of features, similar in spirit to a maximum entropy model. Keyphrases are found for each section, taking into account the keyphrases selected for other sections. The selection could be optimized over all combinations, but for simplicity, we order the text sections and then select keyphrases for each text section, one section at a timer. The features are text based and include:

1. $tf_{sec}$: number of times a term occurs in the current section

2. $tf_{doc}$: number of times a term occurs in the document

3. $df_{Eng}$: number of documents in which a term occurs at least once in an English corpus. We used a list from the Berkeley and Stanford Digital Libraries project, which was available at ftp://elib.cs.berkeley.edu/outgoing/docfreq/, but is not available online anymore.

4. $df_{sec}$: number of sections in a document in which a term occurs at least once 5. k: number of times the candidate keyphrase has previously been selected as a keyphrase 6. t: number of tokens in the keyphrase 7. l: location of first mention of the term in the paragraph The weighted combination of terms is given by:

$$\text{Score}(k_j) = \sum_i \lambda_i f_i(k_j, s_m d)$$

where $\lambda_i$ is the weight given a feature and $f_i(\ )$ is the value of feature i for keyphrase candidate $k_j$ in section $s_m$ in document d. Other combination or ranking models can be used. For example, if training data labeled with keyphrases for each section is available, then more powerful models, such as a maximum entropy model (Berger et al., 1996), could be used instead.

Once each of the keyphrases is scored, they are then ranked against each other and the best keyphrase(s) is selected for each section. For our application, we select only the best keyphrase and limit the maximum number of terms to two because of limited screen space and wanting to keep the font size reasonably readable. Our method is one example of keyphrase selection. Any method which allows for selecting keyphrases with a specified maximum number of terms per keyphrase and a ranking of keyphrases can be used.

Interfaces

The system supports multiple different visualizations and interaction techniques.

FIG. 1 illustrates a multi-document view in accordance with an embodiment of the inventive concept. On the collection overview screen 100, keywords that best describe the set of documents in the collection are distributed about the interface 101. Each document is represented by a square 102. Square location is determined by the number of occurrences of the displayed keywords in the corresponding document. For example, the document represented by a square 105 in FIG. 1 is located slightly closer to 'ipsum' than 'lorem', and not near 'dolor' or 'sit amet'. This indicates that the term 'ipsum' occurs more times than 'lorem' in the document, and that the terms 'dolor' and 'sit amet' do not occur in the document. Square size is determined using the sum of the occurrences of all keyphrases currently in view in the corresponding document (thus, a small square may represent a large document that is not well represented by the keyphrases currently in view). Selecting a keyphrase highlights all of the squares of documents with at least one occurrence of that keyphrase 103 (in this case, "ipsum"). When multiple keyphrases are selected, only the squares of documents with at least one occurrence of each selected keyword are highlighted 104 (in this case, "ipsum" and "lorem"). This approach could be scaled to larger sets of displayed keyphrases using combinations of pan-and-zoom interaction techniques and 3D visualizations.

Figure 2:
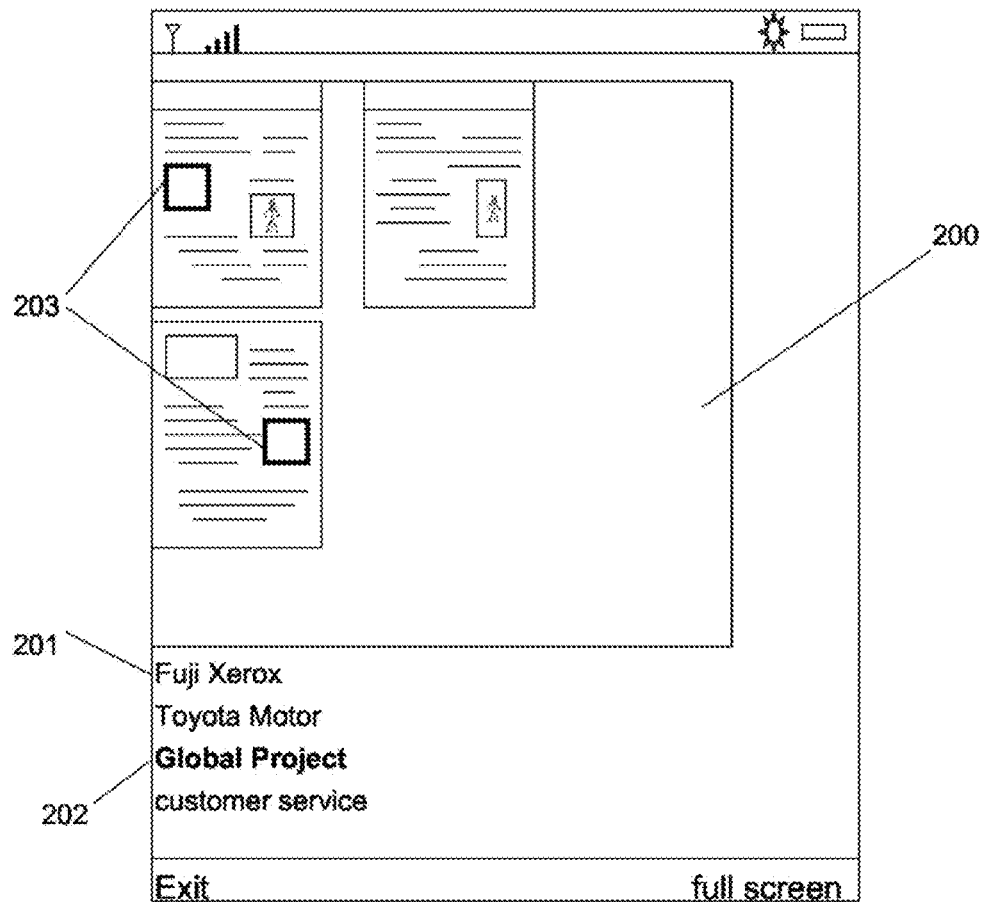
FIG. 2 illustrates document overview with keyphrase selection list in accordance with an embodiment of the inventive concept.

FIG. 2 illustrates document overview with keyphrase selection list. On the document overview screen 200, keyphrases 201 appear on a selection window. As the user scrolls through the selection list 202, the document segments corresponding to those keyphrases are highlighted 203. In the example figure, segments corresponding to the chosen keyphrase "Global Project" are highlighted in the upper left and lower left pages. A user can navigate through the different keyphrases in the selection list by, for example, using the up and down keys or by dragging a pen up and down on the screen or by using a touch panel or the like and also navigate through the highlighted segments as well. Within a keyphrase, a user can navigate through different highlighted segments. When a highlighted segment is selected, it is outlined. Here, the segment in the upper left page is highlighted. When a user enters the input to do so by, for example, pressing the fire button (the middle key on a mobile phone) or taps a highlighted are with a pen or the like, the interface zooms in on the appropriate highlighted segment.

Figure 3:
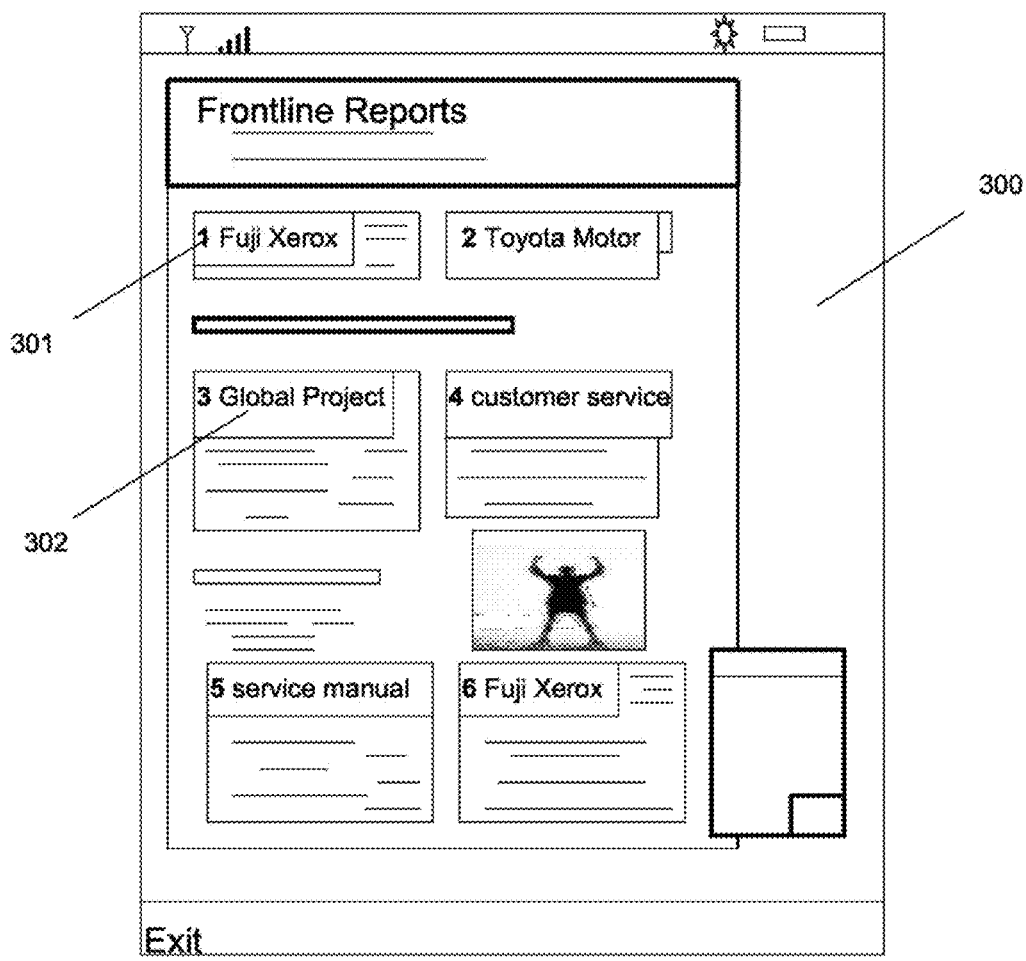
FIG. 3 illustrates page overview in accordance with an embodiment of the inventive concept.

FIG. 3 illustrates page overview. On the page overview screen 300, all of the keyphrases are overlaid on top of their respective segments 301. The keyphrases can also be mapped to numbers on the keypad, which are shown directly next to each keyphrase 302. When a user either taps a keyphrase with a pen or enters a number, the interface zooms in on the appropriate segment. Here, if the user pressed key "3", the application would zoom into that segment.

Figure 4:
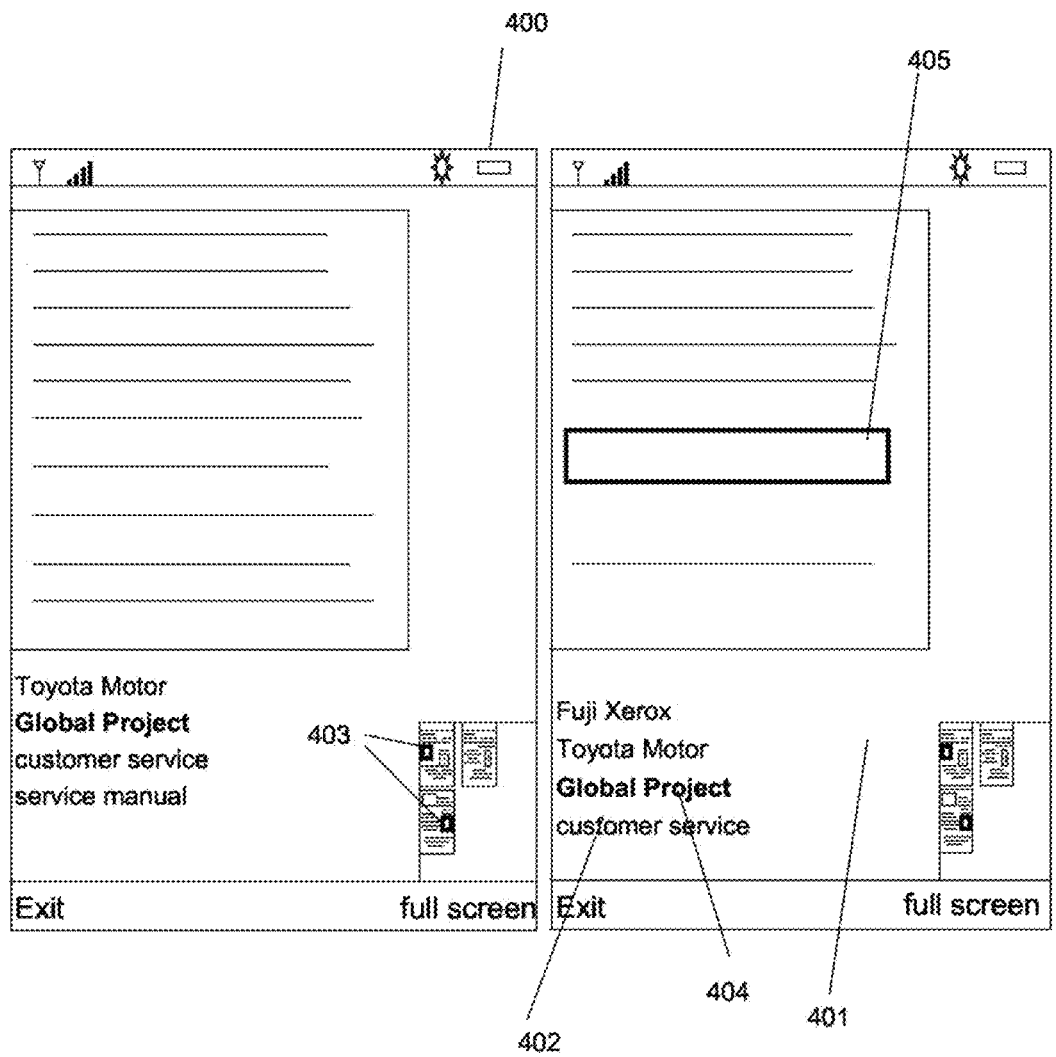
FIG. 4 illustrates reflow (left) and zoomed (right) views in accordance with an embodiment of the inventive concept.

FIG. 4 illustrates reflow (left) and zoomed (right) views. On the zoomed image 401 and text reflow screens 400, the user can navigate through a page's keyphrases on a selection window 402. As the user scrolls through the selection list, the document segments corresponding to those keyphrases are highlighted in an overview visualization 403. A user navigates through the different keyphrases in the selection list using the up and down keys or by dragging a pen up and down on the screen, and selects a keyphrase by pressing the fire button or by selecting a highlighted keyphrase 404. When a user selects a keyphrase, the application then zooms into the appropriate segment 405.

Figure 5:
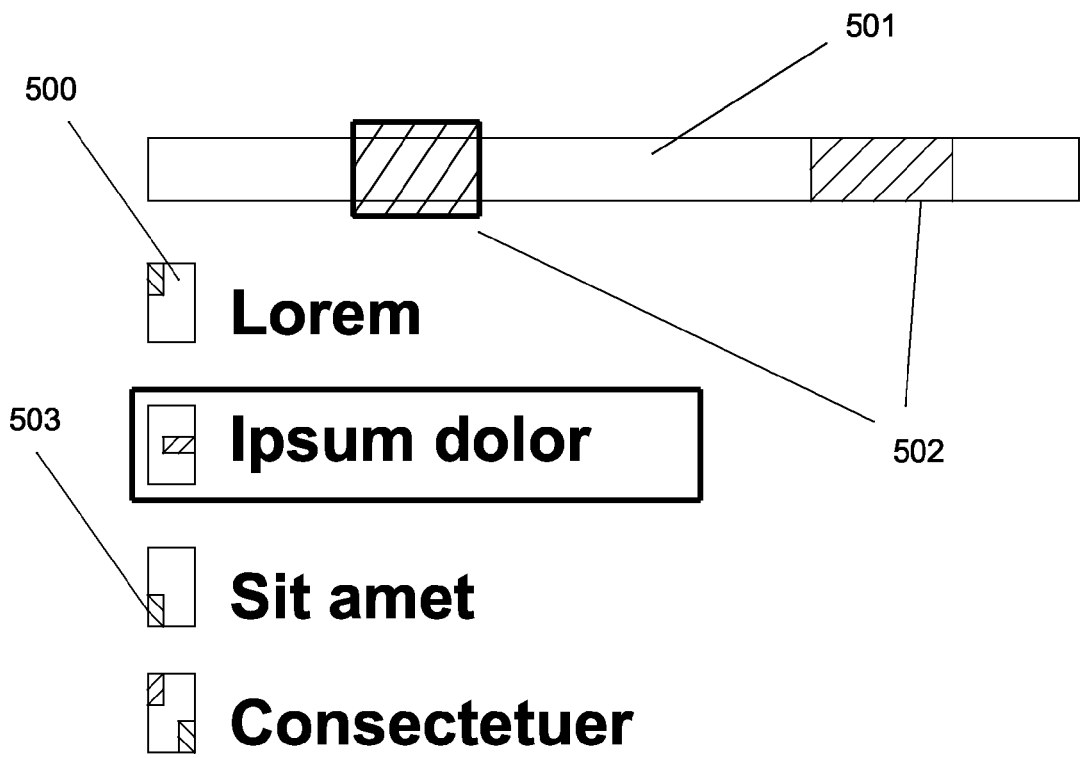
FIG. 5 illustrates alternative keyphrase selection list in accordance with an embodiment of the inventive concept.

FIG. 5 illustrates an alternative keyphrase selection list. In another embodiment, keyphrases in the selection window are shown with small graphic icons next to them 500. This technique adheres to an effective information visualization design principle known as Small Multiples (Tufte, 1990). The graphic icon represents a document page with regions highlighted 503 that correspond to the spatial location of each instance of the keyphrase on the page or the segments on the current page in which the keyphrase appears. Also in this embodiment, a horizontal pane 501 across the top of the selection list highlights all of the pages in the document on which the highlighted keyphrase appears. Boxes highlight the page the user is currently viewing as well as the currently selected keyphrase 502. The small graphic icons allow the reader to infer semantic information about each keyphrase by its location (e.g. a keyphrase is part of the title). The distribution of the keyphrases can also be read off by looking at these graphic icons. The highlights could additionally be coded by color or intensity to indicate the number of times a keyphrase appears in the segment or, for the horizontal pane, the page.

Exemplary Computer Platform

Figure 6:
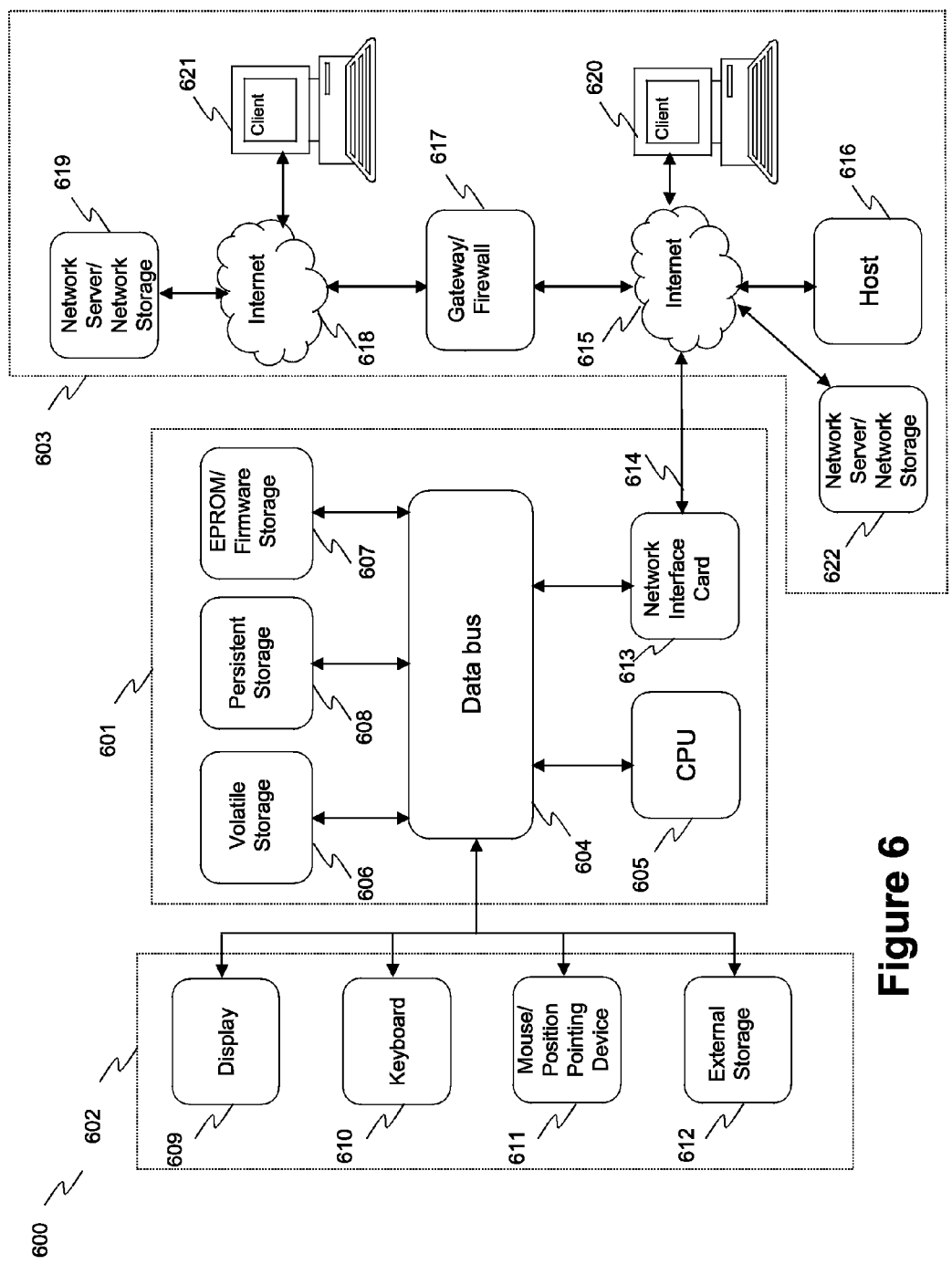
FIG. 6 illustrates an exemplary embodiment of a computer platform upon which the inventive system may be implemented.

FIG. 6 is a block diagram that illustrates an embodiment of a computer/server system 600 upon which an embodiment of the inventive methodology may be implemented. The system 600 includes a computer/server platform 601, peripheral devices 602 and network resources 603.

The computer platform 601 may include a data bus 604 or other communication mechanism for communicating information across and among various parts of the computer platform 601, and a processor 605 coupled with bus 601 for processing information and performing other computational and control tasks. Computer platform 601 also includes a volatile storage 606, such as a random access memory (RAM) or other dynamic storage device, coupled to bus 604 for storing various information as well as instructions to be executed by processor 605. The volatile storage 606 also may be used for storing temporary variables or other intermediate information during execution of instructions by processor 605. Computer platform 601 may further include a read only memory (ROM or EPROM) 607 or other static storage device coupled to bus 604 for storing static information and instructions for processor 605, such as basic input-output system (BIOS), as well as various system configuration parameters. A persistent storage device 608, such as a magnetic disk, optical disk, or solid-state flash memory device is provided and coupled to bus 601 for storing information and instructions.

Computer platform 601 may be coupled via bus 604 to a display 609, such as a cathode ray tube (CRT), plasma display, or a liquid crystal display (LCD), for displaying information to a system administrator or user of the computer platform 601. An input device 610, including alphanumeric and other keys, is coupled to bus 601 for communicating information and command selections to processor 605. Another type of user input device is cursor control device 611, such as a mouse, a trackball, or cursor direction keys for communicating direction information and command selections to processor 604 and for controlling cursor movement on display 609. This input device typically has two degrees of freedom in two axes, a first axis (e.g., x) and a second axis (e.g., y), that allows the device to specify positions in a plane.

An external storage device 612 may be connected to the computer platform 601 via bus 604 to provide an extra or removable storage capacity for the computer platform 601. In an embodiment of the computer system 600, the external removable storage device 612 may be used to facilitate exchange of data with other computer systems.

The invention is related to the use of computer system 600 for implementing the techniques described herein. In an embodiment, the inventive system may reside on a machine such as computer platform 601. According to one embodiment of the invention, the techniques described herein are performed by computer system 600 in response to processor 605 executing one or more sequences of one or more instructions contained in the volatile memory 606. Such instructions may be read into volatile memory 606 from another computer-readable medium, such as persistent storage device 608. Execution of the sequences of instructions contained in the volatile memory 606 causes processor 605 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 605 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 608. Volatile media includes dynamic memory, such as volatile storage 606.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 705 for execution. For example, the instructions may initially be carried on a magnetic disk from a remote computer. Alternatively, a remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on the data bus 604. The bus 604 carries the data to the volatile storage 606, from which processor 605 retrieves and executes the instructions. The instructions received by the volatile memory 606 may optionally be stored on persistent storage device 608 either before or after execution by processor 605. The instructions may also be downloaded into the computer platform 601 via Internet using a variety of network data communication protocols well known in the art.

The computer platform 601 also includes a communication interface, such as network interface card 613 coupled to the data bus 604. Communication interface 613 provides a two-way data communication coupling to a network link 614 that is connected to a local network 615. For example, communication interface 613 may be an integrated services digital network (ISDN) card or a modem to provide a data communication connection to a corresponding type of telephone line. As another example, communication interface 613 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 613 sends and receives electrical, electromagnetic or optical signals that carry digital data streams representing various types of information.

Network link 613 typically provides data communication through one or more networks to other network resources. For example, network link 614 may provide a connection through local network 615 to a host computer 616, or a network storage/server 617. Additionally or alternatively, the network link 613 may connect through gateway/firewall 617 to the wide-area or global network 618, such as an Internet. Thus, the computer platform 601 can access network resources located anywhere on the Internet 618, such as a remote network storage/server 619. On the other hand, the computer platform 601 may also be accessed by clients located anywhere on the local area network 615 and/or the Internet 618. The network clients 620 and 621 may themselves be implemented based on the computer platform similar to the platform 601.

Local network 615 and the Internet 618 both use electrical, electromagnetic or optical signals that carry digital data streams. The signals through the various networks and the signals on network link 614 and through communication interface 613, which carry the digital data to and from computer platform 601, are exemplary forms of carrier waves transporting the information.

Computer platform 601 can send messages and receive data, including program code, through the variety of network(s) including Internet 618 and LAN 615, network link 614 and communication interface 613. In the Internet example, when the system 601 acts as a network server, it might transmit a requested code or data for an application program running on client(s) 620 and/or 621 through Internet 618, gateway/firewall 617, local area network 615 and communication interface 613. Similarly, it may receive code from other network resources.

The received code may be executed by processor 605 as it is received, and/or stored in persistent or volatile storage devices 608 and 606, respectively, or other non-volatile storage for later execution. In this manner, computer system 601 may obtain application code in the form of a carrier wave.

Figure 7:
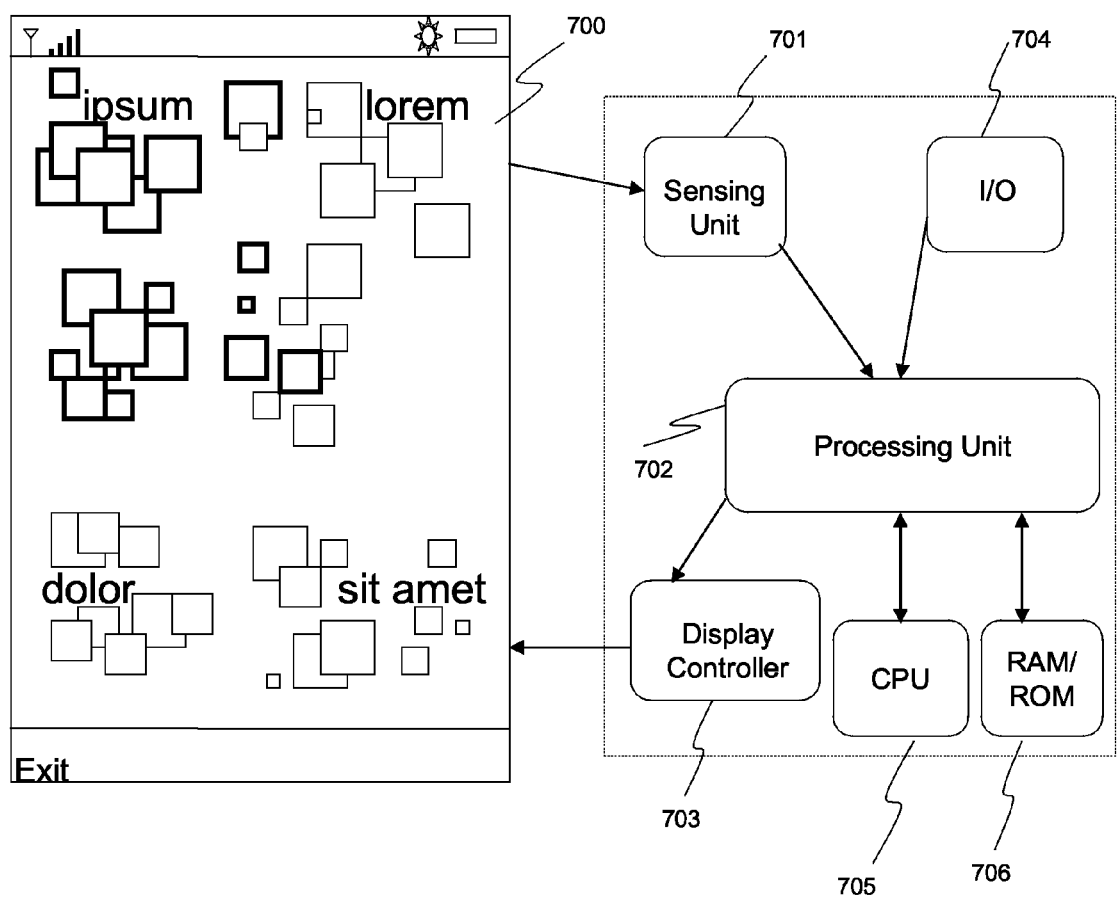
FIG. 7 illustrates an example functional diagram of how the present invention relates to the computer platform.

FIG. 7 illustrates an example functional diagram of how the present invention relates to the computer platform.

Presented is an example of how an exemplary embodiment of the present invention utilizes segmentation and keyphrase summarization for document navigation, the example computer platform being used, and an example as to how it relates to the computer platform. Here, the figure illustrates the collection overview screen embodiment. When input is given through the display 700, a sensing unit 701 senses the input and forwards it to the processing unit. This information is then sent to a processing unit 702 which processes the information and interprets the command that the user had inputted through the display. The processing unit may utilize RAM/ROM 706 and the CPU 705 for processing the information. For example, if the user input is a command to highlight all of the squares of documents corresponding to the keyword "ipsum", the processing unit will process those instructions and forward it to the display controller 703, which then proceeds to highlight all of the squares of documents with at least one incidence of that keyword. Similarly, if the user inputs a command to highlight all of the squares of documents corresponding to multiple keywords, then only the squares of the documents with those multiple keywords are highlighted. Other embodiments of the invention are also possible through this example computer platform. Furthermore, the computer platform is not limited to receiving commands by tactile interaction; other I/O devices 704 as previously described may be attached to the computer platform for inputting commands for the processing unit.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the inventive information display and navigation system. It is intended that the specification and examples be considered as exemplary only, with a true scope and spirit of the invention being indicated by the following claims.

What is claimed is:

1. A method of navigating a document, comprising:
   dividing the document into a plurality of segments;
   generating, for at least one of the plurality of segments, at least one keyphrase, which is representative of content of the at least one of the plurality of segments, and associating the generated at least one keyphrase with the at least one of the plurality of segments represented by the generated at least one keyphrase;
   displaying the generated at least one keyphrase;
   upon a user's selection of the generated at least one keyphrase, enabling the user to view a corresponding segment of the document; and
   displaying a visual representation for each of the plurality of segments,
   wherein the position of each visual representation with respect to each of the plurality of generated keyphrases depends on a degree of relatedness between each of plurality of generated keyphrases and the corresponding segment.

2. The method of claim 1, wherein the plurality of segments of the document are identified using a layout analysis or an optical character recognition (OCR) performed on the document.

3. The method of claim 1, wherein the plurality of segments of the document are identified using at least one tag associated with the document.

4. The method of claim 1, wherein the plurality of segments of the document are identified using heuristics based on line spacing, font height or indentation.

5. The method of claim 1, wherein the at least one keyphrase is generated by tagging a part of speech (POS) of a text of the document and identifying POS tag sequences corresponding to a noun phrase.

6. The method of claim 1, wherein during the displaying, the generated least one keyphrase is overlaid over the corresponding identified segment of the document.

7. The method of claim 1, wherein the segments are highlighted on an icon next to a keyphrase to represent each segment's location to a corresponding document.

8. The method of claim 7, wherein the segments are highlighted on a bar to represent each segment's location to a corresponding page in a document.

9. The method of claim 1, wherein the determining at least one keyphrase is generated by utilizing a statistical method based on at least one of:
   number of times a term occurs in a given section;
   number of times a term occurs in a document;
   number of documents in which a term occurs at least once in an English corpus;
   number of sections in a document in which a term occurs at least once;
   number of times the candidate keyphrase has previously been selected as a keyphrase;
   number of tokens in the keyphrase; and
   location of first mention of the term in the paragraph.

10. A non-transitory computer readable medium storing a sequence of instructions, which, when executed by one or more processors, cause the one or more processors to execute a process for document navigation, the process comprising:
   dividing the document into a plurality of segments;
   generating, for at least one of the plurality of segments, at least one keyphrase, which is representative of content of the at least one of the plurality of segments, and associating the generated at least one keyphrase with the at least one of the plurality of segments represented by the generated at least one keyphrase;
   displaying the generated at least one keyphrase;
   upon a user's selection of the generated least one keyphrase, enabling the user to view the corresponding segment of the document, and
   displaying a visual representation for each of the plurality of segments,
   wherein the position of each visual representation with respect to each of the plurality of generated keyphrases depends on a degree of relatedness between each of plurality of automatically generated keyphrases and the corresponding segment.

11. The computer readable medium of claim 10, wherein the plurality of segments of the document are identified using a layout analysis or an optical character recognition (OCR) performed on the document.

12. The computer readable medium of claim 10, wherein the plurality of segments of the document are identified using at least one tag associated with the document.

13. The computer readable medium of claim 10, wherein the plurality of segments of the document are identified using heuristics based on line spacing, font height or indentation.

14. The computer readable medium of claim 10, wherein the at least keyphrase is generated by tagging a part of speech (POS) of a text of the document and identifying POS tag sequences corresponding to a noun phrase.

15. The computer readable medium of claim 10, wherein during the displaying, the generated least one keyphrase is overlaid over the corresponding identified segment of the document.

16. The computer readable medium of claim 10, wherein the determining at least one keyphrase is generated by utilizing a statistical method based on at least one of:
   number of times a term occurs in a given section;
   number of times a term occurs in a document;
   number of documents in which a term occurs at least once in an English corpus;
   number of sections in a document in which a term occurs at least once;
   number of times the candidate keyphrase has previously been selected as a keyphrase;
   number of tokens in the keyphrase; and
   location of first mention of the term in the paragraph.

17. The computer readable medium of claim 10, wherein the segments are highlighted on an icon next to a keyphrase to represent each segment's location to a corresponding document.

18. The computer readable medium of claim 17, wherein the segments are highlighted on a bar to represent each segment's location to a corresponding page in a document.

19. A device, comprising:
   a display unit;
   a sensing unit, operable to sense input;
   a processing unit, operable to process the input, to divide a document into a plurality of segments; and to forward instructions to a display controller to highlight, zoom, or navigate through the identified document segments;
   the display controller operable to process the forwarded instructions and to generate a resulting visual representation for display on the display unit, wherein the processing unit is further operable to generate, for at least one of the plurality of segments, at least one keyphrase, which is representative of content of the at least one of the plurality of segments, and associate the generated at least one keyphrase with the at least one of the plurality of segments represented by the generated at least one keyphrase; and
   displaying a visual representation for each of the plurality of segments,
   wherein the position of each visual representation with respect to each of the plurality of generated keyphrases depends on a degree of relatedness between each of plurality of generated keyphrases and the corresponding segment.

20. The device of claim 19, wherein the sensing unit further comprises receiving input of a user's selection of at least one keyphrase; and the processing unit further comprises forwarding instructions to the display controller to enable the user to view the corresponding segment of the document.

21. The device of claim 20, wherein the processing unit further comprises forwarding instructions to the display controller to overlay the generated least one keyphrase over a corresponding identified segment of a document.

22. The device of claim 19, wherein the processing unit further comprises a recognition module operable to determine the at least one keyphrase by tagging a part of speech (POS) of a text of the document and identifying POS tag sequences corresponding to a noun phrase.

23. The device of claim 19, wherein the processing unit further comprises a memory unit operable to store processing instructions for identifying the plurality of segments of the document.

24. The device of claim 19, wherein the processing unit further comprises a document processing module operable to identify the plurality of segments of the document using at least one tag associated with a document.

25. The device of claim 19, wherein the processing unit further comprises a document processing module operable to identify the plurality of segments of the document using heuristics based on line spacing, font height or indentation.

26. The device of claim 24, wherein the processing unit further comprises a document processing module operable to identify the plurality of segments of the document using a layout analysis or an optical character recognition (OCR) performed on the document.

27. The device of claim 19, wherein the processing unit determines at least one keyphrase by utilizing a statistical method based on:
   number of times a term occurs in a given section;
   number of times a term occurs in a document;
   number of documents in which a term occurs at least once in an English corpus;
   number of sections in a document in which a term occurs at least once; number of times the candidate keyphrase has previously been selected as a keyphrase;
   number of tokens in the keyphrase; and
   location of first mention of the term in the paragraph.

28. A non-transitory computer readable medium storing a sequence of instructions, which, when executed by one or more processors, cause the one or more processors to execute a process for document navigation, the process comprising:
   displaying documents as visual representations and grouping the documents based on the occurrences of keyphrases, which are representative of the content of the documents; wherein the size of each visual representation depends on a function of the number of occurrences of all keyphrases in the corresponding document;
   highlighting all of the visual representations with at least one occurrence of a selected keyphrase; and
   when multiple keyphrases are selected, highlighting only visual representations with at least one occurrence of each of the multiple keyphrases selected.

29. The method of claim 1, further comprising:
   displaying a plurality of generated keyphrases, each of the plurality of keyphrases representative of at least one of the plurality of segments; and
   wherein a size of each visual representation depends on a function of a number of occurrences of all of the plurality of generated keyphrases in the corresponding segment.

30. The computer readable medium of claim 10, further comprising:
- displaying a plurality of generated keyphrases, each of the plurality of keyphrases representative of at least one of the plurality of segments; and
- wherein a size of each visual representation depends on a function of a number of occurrences of all of the plurality of generated keyphrases in the corresponding segment.

31. The device of claim 19, wherein the display controller controls the display to:
- displaying a plurality of generated keyphrases, each of the plurality of keyphrases representative of at least one of the plurality of segments; and
- wherein a size of each visual representation depends on a function of a number of occurrences of all of the plurality of generated keyphrases in the corresponding segment.

* * * * *